July 11, 1933.    E. A. WARD    1,917,477
TRANSMISSION
Filed Sept. 23, 1932    4 Sheets-Sheet 1

INVENTOR.
ERNEST A. WARD
BY Adam E. Fisher
ATTORNEY.

July 11, 1933.  E. A. WARD  1,917,477
TRANSMISSION
Filed Sept. 23, 1932  4 Sheets-Sheet 3

INVENTOR.
ERNEST A. WARD
BY Adam E. Fisher
ATTORNEY.

July 11, 1933.  E. A. WARD  1,917,477

TRANSMISSION

Filed Sept. 23, 1932    4 Sheets-Sheet 4

INVENTOR.
ERNEST A. WARD
BY Adam E. Fisher
ATTORNEY.

Patented July 11, 1933

1,917,477

UNITED STATES PATENT OFFICE

ERNEST A. WARD, OF BEAUMONT, CALIFORNIA

TRANSMISSION

Application filed September 23, 1932. Serial No. 634,486.

My invention relates to improvements in transmissions or speed changing devices as employed in motor vehicles.

The main object of my invention is to provide a transmission assembly requiring a minimum of attention and manual operation by the driver of the vehicle and in which the speed changing or varying elements are automatically brought into proper relation and engagement under the control of the road or traveling speed of the vehicle.

Another object is to provide a transmission of this kind including a sliding gear assembly for driving the vehicle, a governor driven directly at and by the speed of travel of the vehicle and connected to the said sliding gear assembly to reciprocate and adjust the same longitudinally on its supporting shaft, and engine driven and manually controlled forward and reverse gear assemblies operable to move into mesh with the sliding gear assembly and connect the engine thereto to drive the vehicle at various speeds according to the position of said sliding assembly.

Another object is to provide a transmission of the above character in a simple and efficient form and including also a simple and readily operated control and operating mechanism for engaging or disengaging the forward and reverse gear assemblies with the sliding gear assembly as aforesaid.

With these and other objects in view the invention resides in the novel construction and arrangement of parts as hereinafter set forth and claimed, reference being had to the accompanying drawings wherein:

Figure 7 is an enlarged vertical cross section through the driven shaft and sliding sleeve showing the temporary stop.

In carrying out my invention I provide a housing or case designated generally at 1 and preferably though not necessarily formed in three sections comprising the bottom casting 2, and two complementary and mating top castings or sections 3 and 4 all joined together along their meeting lines by bolts or screws 5 through flanges 6 after the manner of conventional construction of this kind. The housing 1 is substantially cylindrical in cross section as shown but is diametrically enlarged at its rear portion at 7 and has radially extended or projecting pockets or lobes 8 and 9 formed on its sides and bottom at its forward end as shown. The front and rear ends 10 and 11 of the housing thus formed have aligned bearings 12 and 13 disposed in a plane somewhat above the longitudinal axis of the housing.

The rear end of the main transmission or drive shaft A from the engine (not shown) is journaled through the front bearing 12 and extends inward a short distance into the housing 1 and a main or countershaft drive gear 14 is fixed on this inwardly extended end of the shaft. A ball thrust bearing 15 is placed between the main drive gear 14 and the inner end of the bearing 12 and a conventional roller bearing 16 and oil sealing ring 17 is placed in the bearing around the shaft A. A propeller or driven shaft B is journaled through the rear bearing 13 and through a roller bearing 18 and oil sealing ring 19 therein and extends inwardly through the housing 1 to the end of the transmission shaft A, the rear end of said shaft B of course running to the differential or other driven element (not shown). The inner end of the propeller shaft B has a reduced pilot or stem 20 which is journaled in a complementary pilot bearing socket 21 in the inner end of the drive shaft A whereby the two shafts may rotate independently but will mutually brace and reinforce each other. A conventional ball thrust bearing 22 is interposed between the inner ends of the shafts A and B for a well known purpose.

The propeller shaft B is squared or cut square in cross section at its inner end portion as shown at 23 and a gear carrying sleeve 24 is slidably mounted by its square bore 25 on this end of the shaft so as to rotate therewith. Rigidly secured to this sleeve 24 are the first or low speed gear 26, the second or intermediate speed gear 27 and the high speed gear 28 arranged from front to rear thereon in the order named and graduated in size as shown, the low gear being of course the largest, the high gear the smallest and the intermediate gear of a size between the two. The arrangement furthermore is such that the low gear 26 is disposed near the front end of the sleeve while the intermediate and high speed gears 27 and 28 are disposed adjacent each other at a considerable distance rearwardly of the low gear and adjacent the rear end of the sleeve 24.

Figure 4:
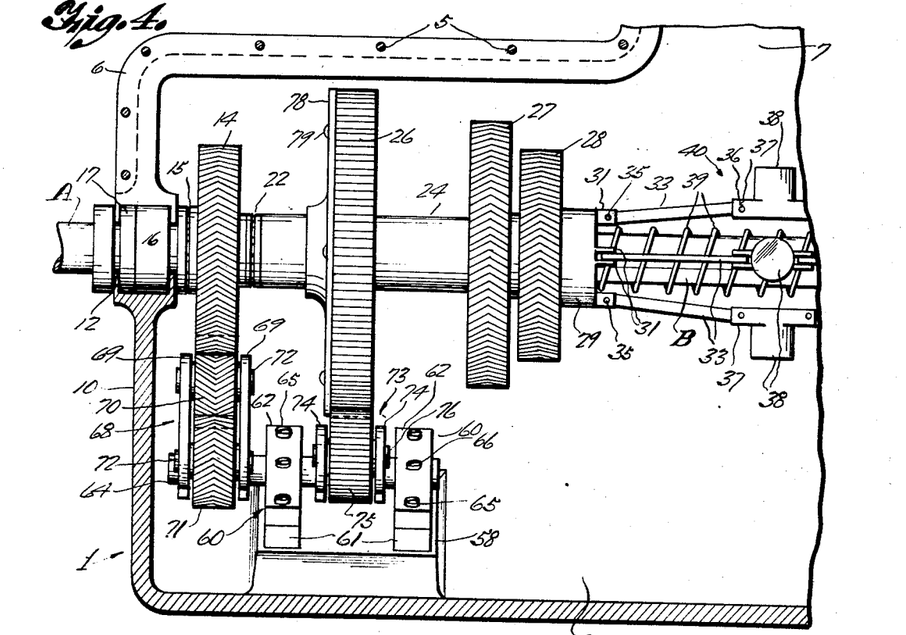
Figure 4 is a longitudinal vertical section through the forward portion of the transmission taken along the line 4—4 in Figure 3 and showing the reverse gear assembly in mesh with the sliding gear assembly.

A governor 40 is provided comprising end collars 29 and 30 secured by set screws 29a and 30a to the rear end of the sleeve 24 at the rear of the high speed gear 28 and to the propeller shaft B just within the rear end 11 of the housing 1 respectively and these collars have four equally spaced sets of apertured pivot lugs or ears 31 and 32 extended from their inner or facing margins as shown. Four sets of governor arms 33 and 34 are provided and are pivoted at their outer ends by pins 35 between the said pivot lugs 31 and 32 and at their inner ends are similarly pinned at 36 between ears 37 extended from the governor weights 38 as shown. An expansion coil spring 39 is coiled around the propeller shaft B and is braced between the rear governor end collar 30 and the rear end of the sleeve 24 whereby to force said sleeve forwardly on the shaft and normally maintain the governor 40 in its collapsed position shown in full lines in Figures 2 and 4. A ball thrust bearing 41 is interposed between the rear collar 30 and the inner end of the bearing 13 to take the end thrust of the spring 39.

Figure 2:
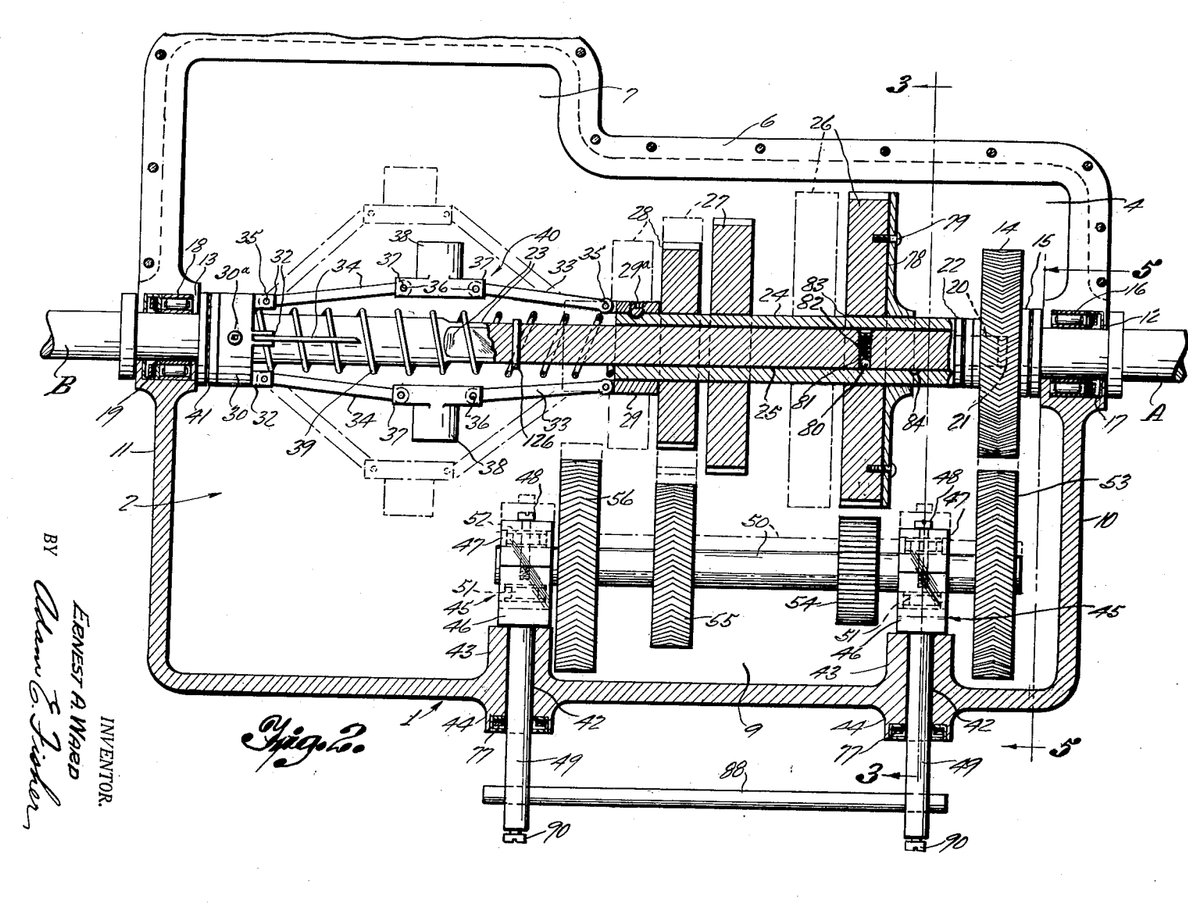
Figure 2 is an enlarged longitudinal and vertical cross section through the transmission showing the neutral or inoperative position of the parts in full lines and the position of the parts in second or intermediate speed in dot-dash lines.

Spaced apertures 42 are provided in the bottom casting 2 of the housing 1 and in the lobe or pocket 9 thereof and bosses 43 and 44 are formed on the casting both on the inside and outside around these apertures 42 as shown. One aperture 42 is located near the front end of the housing 1 and the other is located in line and rearwardly along the housing and each of the apertures are drilled at an angle to the vertical and radially with respect to the axes of the shafts A and B. Countershaft bearings 45 are provided comprising base blocks 46 and caps 47 secured thereto by screws 48 and operating stems or rods 49 are extended from these base blocks 46 and are slidably mounted outwardly through the apertures 42 whereby said blocks may rest on the inner bosses 43. A countershaft 50 is journaled in roller bearings 51 mounted in the recesses 52 in the bearings 45 and extends at its forward end forwardly of the front bearing to receive the countershaft drive gear 53 which is rigidly secured thereto in alignment with the transmission drive gear 14. Secured to the counter-shaft 50 between the bearings 45 are the first or low speed driving gear 54, the second or intermediate speed driving gear 55 and the high speed driving gear 56 arranged on the shaft from front to back in the order named. The low speed gear 54 is the smallest and is so located as to line up with the low speed gear 26 on the sleeve 24 in the normal position thereof while the second speed gear 55 is larger and is located rearwardly of an alignment with the other second speed gear 27 by a distance slightly over the thickness or width of the gears. The high speed driving gear 56 is still larger in diameter and is located rearwardly from a point in alignment with its mating gear 28 on the sleeve 24 by a distance slightly over twice the thickness of the gears for a purpose which will presently appear. The sizes of all the gears are such that those on the counter-shaft 50 will rest a substantial distance clear of and out of mesh with those on the sleeve 24 and shaft A as shown in Figure 2.

Figure 3:
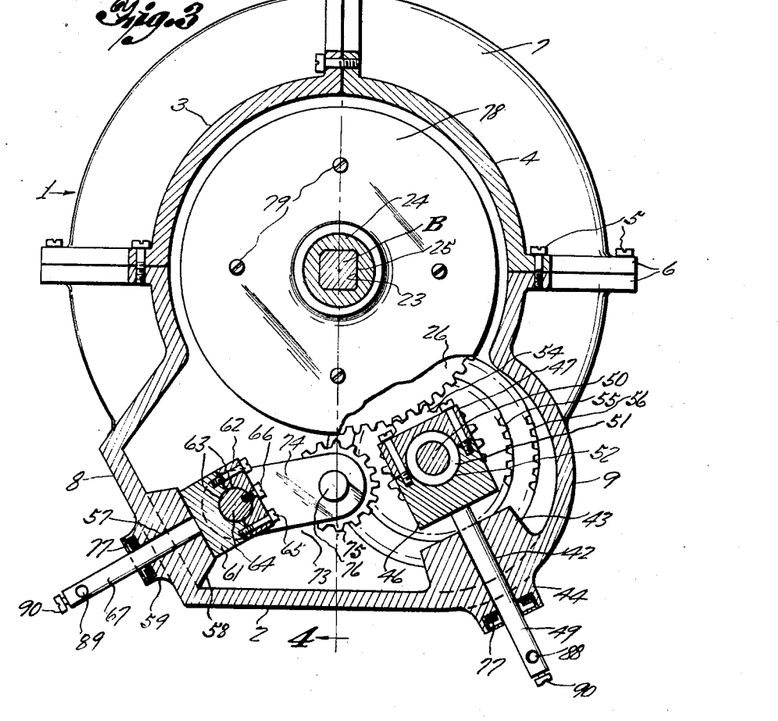
Figure 3 is a vertical cross section along the line 3—3 in Figure 2, the forward gear assembly being shown in mesh or operative position.
Figure 5:
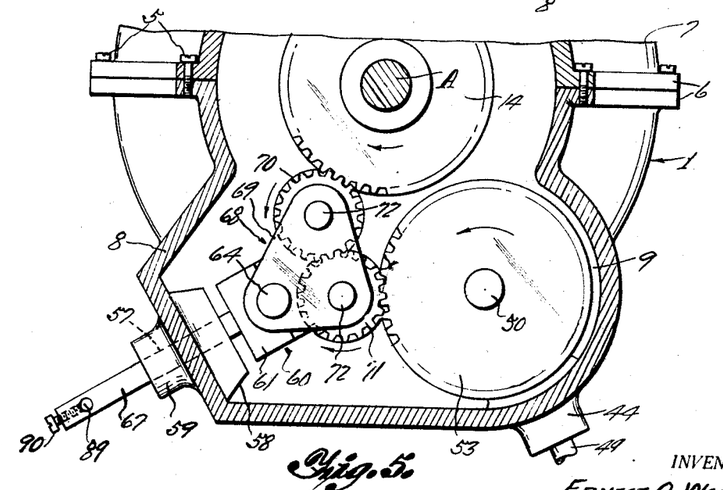
Figure 5 is a vertical cross section through the lower frontal position of the transmission taken along the line 5—5 in Figure 2 and also showing the reverse gear assembly in mesh.

A spaced pair of apertures 57 are formed through the bottom casting 2 of the housing at the lobe or pocket 8 thereof and inner and outer bosses 58 and 59 are provided on the inner and outer faces of the castings around these apertures as shown and substantially as previously described. These apertures 57 are likewise bored at an angle to the vertical and their inwardly extended axes fall substantially on a line with the meeting point between the gears 14 and 53 as shown in Figure 3. A pair of reverse shaft clamps 60 are provided comprising base blocks 61 and caps 62 having mating recesses 63 adapted to receive and hold a reverse shaft 64. The caps 62 are held on the blocks 61 by screws 65 and the shaft 64 is locked against rotation by set screws 66 threaded through the caps. Operating stems or rods 67 similar to the aforesaid stems 49 are extended from the base blocks 61 and are slidably mounted outwardly through the apertures 57. The reverse shaft 64 extends forwardly from the front clamp 60 and a yoke 68 is secured to this end of the shaft and comprises spaced substantially triangular side plates 69 rigidly secured at one corner to the shaft by welding or other suitable means. Counter-shaft reverse driving pinions 70 and 71 are journaled by their shafts 72 in the other corners of the side plates 69 and are disposed and arranged in mesh between these plates in such position that they will line up with the transmission drive gear 14 and the counter-shaft drive gear 53 as shown. The yoke 68 is angularly disposed on the shaft 64 in such manner that the pinions 70 and 71 may be moved into mesh with the gears 14 and 53 by moving the clamps 60 and operating stems 67 inwardly in the housing to the position shown in Figure 5, it being understood of course that the forward gear and counter-shaft assembly will be out of mesh with the gears on the sleeve 24 at this time. Another yoke 73 is secured to the shaft 64 between the clamps 60 and comprises elongated substantially rectangular side plates 74 rigidly secured at one end to the said shaft by welding or otherwise and extended radially therefrom. An idler pinion 75 is journaled by its shaft 76 in the outer ends of the plates 74 and this pinion is disposed between the side plates in line with the low gears 26 and 54 and the angle at which the yoke 73 is set is such that this pinion may be moved into mesh with these gears by the aforesaid inward movement of the clamps 60 and operating stems 67. The apertures 42 and 57 through which the operating stems 49 and 67 pass are protected against oil leakage by conventional oil sealing rings 77.

In the operation of the structure as so far described as in use upon an automobile and assuming that the drive shaft A is driven by the automobile engine and the propeller or driven shaft B is suitably connected to drive the rear wheels of the automobile the transmission or drive gear 14 will be rotated at the engine speed. To drive the driven shaft B the operating stems 49 are then pushed inward moving the countershaft 50 toward the shafts A and B and meshing the countershaft drive gear 53 with the transmission drive gear 14 whereby the countershaft will be driven at the same speed as, but in the opposite direction to the drive shaft A. At the same time the low speed driving gear 54 will be moved into mesh with the low speed gear 26 on the sleeve 24 and the shaft B will be rotated at a slower speed but in the same direction as the drive shaft B as will be understood. Now the automobile will be in motion in a forward direction and as it gains speed the centrifugal force of the governor weights 38 will exert a rearward pull on the sleeve 24. In order to prevent the low gear 26 from moving sidewise out of engagement with the low speed driving gear 54 under the influence of this rearward pull of the governor said gear 26 has a circular lock plate 78 secured by screws 79 to its forwardly disposed face and extended outward flush with the outer ends or faces of its teeth whereby the plate will be alongside the teeth of the gear 54 and hold the gears in mesh as will be understood. To shift to second or intermediate speed the operating stems 49 are then pulled outward disengaging the low gears 26 and 54 upon which the governor will pull the sleeve 24 back on its shaft B as will be understood. A temporary stop is provided to hold this sleeve 24 in the desired position for second speed which stop comprises a ball 80 slidably mounted in a diametrically extended passage 81 cut through the shaft B and normally pressed outward against the bore 25 of said sleeve by an expansion coil spring 82 braced between the ball and a set screw 83 threaded in the passage 81. A shallow recess 84 is provided in the bore of the sleeve 24 in such position that it will register with the passage 81 when the sleeve has moved rearwardly on the shaft A to the point at which the second speed gears 27 and 55 are in line, at which point the ball 80 will move outward into the recess and act to retard and hold the sleeve against further movement at the governor speed and power then existing. The operating stems 49 are then pushed inward again meshing the drive gears 14 and 53 and at the same time meshing the aligned second speed gears 27 and 55 as shown in dot dash lines in Figure 2 causing the shaft B to be rotated at a speed nearer that of the shaft A by the more nearly equal ratio between the gears. This increase in speed of the shaft B and of course of the automobile, further expands the governor 40 and exerts a greater pull on the sleeve 24 but the gears 27 and 55 while in mesh are held against lateral displacement and disengagement under the strain of this pull by virtue of the fact that they have herringbone cut teeth as shown, though it is obvious that a locking plate similar to that previously described might be employed if it is desired to use spur gears at this point. To shift to high speed the operating stems 49 are again pulled outward disengaging the gears 14 and 53 and the second speed gears 27 and 55 upon which the tension or strain of the governor upon the sleeve 24 will overcome the resistance or reluctance of the temporary stop ball 80 in the recess 84 and will pull the sleeve rearwardly on the shaft B until the high speed gears 28 and 56 are in alignment at which point the rear end of the sleeve strikes a permanent stop pin 126 secured diametrically through the shaft B as shown. The stems 49 are then again pushed inwardly meshing the drive gears 14 and 53 and the high speed gears 28 and 56 and driving the shaft B at a speed greater than that of the low and second speeds described. This position is maintained in normal travel until it is desired to stop or reduce speed when it is only necessary to disengage the gears by pulling outward on the operating stems 49 and as the automobile loses momentum the speed of the shaft B and governor 40 will diminish so that the spring 39 will urge the sleeve forward through second to low position. Further details of this operation will be apparent without description and it will be noted that in any of the three positions of the sleeve 24 only the proper gears thereon will be in alignment with those of the countershaft 50 and the remaining gears will clear each other. Due to their increased efficiency herringbone gears are preferably employed at 14, 53, 27, 55, 28, 56 and in the reverse driving pinions 70 and 71 as shown, it being necessary however to use spur gears at 26, 54 and in the reverse idler pinion 75 due to the fact that this pinion must mesh with both gears as will appear and as will be readily understood to those skilled in the art.

To reverse the travel of the automobile the stems 49 are pulled outward to disengage the drive gears 14 and 53 and the operating stems 67 of the reverse gear assembly are then pushed inward meshing the driving pinions 70 and 71 with the drive gears 14 and 53 respectively and at the same time meshing the reverse idler pinion 75 with the low gears 26 and 54. The countershaft 50 is thus driven at the opposite speed to that of the drive shaft A and the propeller or driven shaft B is driven at the opposite speed and considerably slower than the said drive shaft. This rotation of the shaft B is opposite or the reverse of that when the gears on the countershaft 50 drive it as described and of course the result is movement of the automobile rearwardly. In accord with the usual practice this rearward speed is relatively low and hence the governor 40 will not be expanded and the sleeve 24 will remain in its low speed position, the locking plate 78 preventing any lateral displacement of the gears in mesh. The various angular velocities at which the shaft B is driven relative to that of the drive shaft A may be varied at will by changing the ratio between the various meshing gears.

Figures 1, 6:
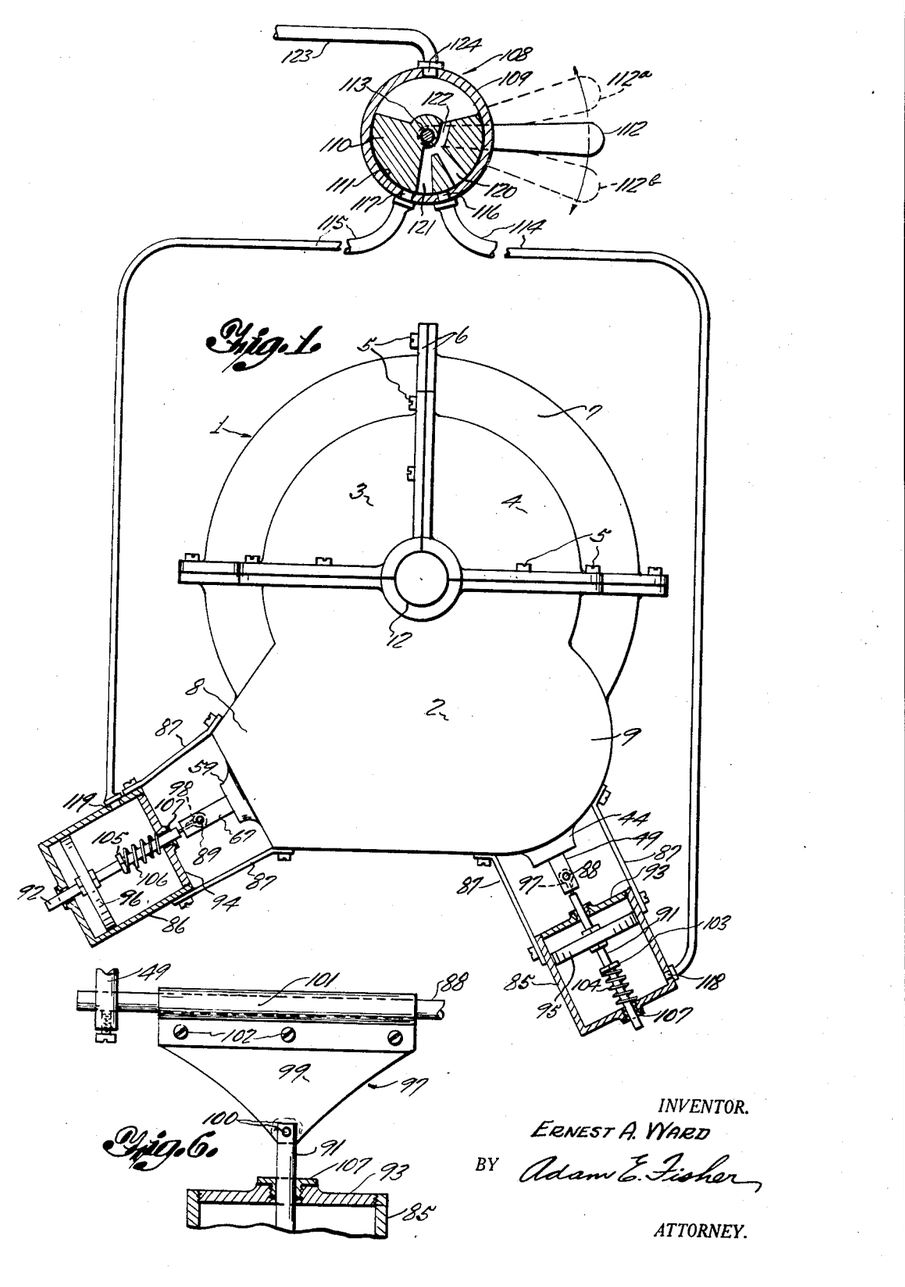
Figure 1 is a front end elevation of my transmission, showing the operating mechanism in diagrammatic form and partially in cross section.
Figure 6 is an enlarged detail in elevation of one of the yokes used in connecting the operating cylinders to the cross bars of the forward and reverse gear assemblies.

The necessary reciprocation and manipulation of the operating stems 49 and 67 for operating the transmission may be carried out by mechanical systems of levers or by electromagnetically operating means (both not shown) or by the vacuum or suction operated system shown in Figure 1 and herein described. This system comprises operating cylinders 85 and 86 secured by brackets 87 to the housing 1 with their axes in alignment with the operating stems 49 and 67 respectively. The cylinders 85 and 86 are disposed midway between the said stems on each side which stems are connected by tie rods 88 and 89 near their outer ends, said tie rods being secured to their respective stems by set screws 90 as shown. Piston rods 91 and 92 are slidably extended through the caps 93 and 94 of the cylinders as well as through the outer closed ends thereof and pistons 95 and 96 are mounted on these piston rods within the cylinders. Connecting brackets 97 and 98 are secured to the ends of the piston rods 91 and 92 nearest the housing 1, said brackets being formed of substantially triangular plates 99 welded and pinned at 100 to the piston rods and curled at their margins 101 around the tie rods 88 and 89 and secured thereon by screws 102 as shown in Figure 6. A nut 103 is threaded on the piston rods 91 within the cylinder 85 operating the stems 49 and an expansion coil spring 104 is braced between this nut and the end of the cylinder to normally force the said stems 49 inwardly as will be understood. In similar fashion a nut 105 is threaded on the piston rod 92 in the cylinder 86 operating the stems 67 and an expansion coil spring 106 is braced between this nut and cap 94 of this cylinder so that it will normally draw the said stems 67 outward in the housing as will be understood, this action being opposite to that of the stems 49. The piston 95 in the cylinder 85 is arranged to normally rest near the inner end of the cylinder while the piston 96 in the cylinder 86 normally rests near the outer closed end of its cylinder as shown. In accord with usual practice the piston rods 91 and 92 pass through packing glands 107 in each end of the cylinders to prevent leakage. The foregoing arrangement is such that the countershaft 50 is normally forced inward to mesh the gears for forward motion of the automobile while the reverse gear assembly is held inoperative.

A control valve designated generally at 108 is provided and is mounted on the steering column (not shown) or in any other position convenient to the hand of the driver, said valve comprising a housing or shell 109 and a segmental cam-like rotor 110 journaled therein with its arcuate periphery 111 in close contact with the inner wall of said shell. The rotor 110 may be rotated in the shell by a handle 112 secured to a shaft 113 rigidly attached to said rotor. Pipes 114 and 115 are connected at one end at 116 and 117 with the shell 109 at spaced points and communicate with the interior thereof, one pipe 114 leading from the valve to the operating cylinder 85 and connected thereto at 118 near its outer end while the other, 115, leads to the other cylinder 86 and is connected at 119 thereto near its inner end. The rotor 110 has spaced radially extended ports or passages 120 and 121 opening at their outer ends through the face 111 of the rotor and communicating at their inner ends with the interior of the shell 109 through a passage 122. The outer ends of the passages 120 and 121 are so spaced that they may be brought into registry with the pipes 114 and 115 by turning the rotor. A pipe 123 is connected at 124 to the shell 109 and communicates with the interior thereof and from that point leads to the intake manifold (not shown) near its junction with the carburetor.

In operation as the engine runs a suction is set up in the pipe 123 and the interior of the shell 109 by the intake manifold as will be understood. This suction in the normal forward position of the valve as shown is cut off from the operating cylinders 85 and 86 and the gears on the countershaft 50 are thus properly meshed. In shifting from low to second or from second to high as hereinbefore set forth the handle 112 is turned to the position shown in dotted lines 112a moving the port 121 into registry with the pipe 114 causing a suction to be set up in the cylinder 85 which pulls the piston 95 and the operating stems 49 outward to disengage the gears as necessary. The handle 112 is then again moved to its position shown in full lines cutting off the pipe 114 and allowing the spring 104 to reassert itself and force the stems 49 inward to mesh the gears. This operation is repeated each time gears are shifted. To shift to reverse it is necessary to draw the stems 49 outward to disengage the forward gears and the ports 120 and 121 are arranged so that by swinging the handle 112 in the opposite direction to the point shown in broken lines 112b both pipes 114 and 115 are opened setting up a suction in both cylinders 85 and 86 this suction drawing the stems 49 outward as necessary while the stems 67 are forced inward to mesh the reverse gears. The parts return to their normal position when the valve 108 is closed.

It will be apparent that the foregoing structure is simple, efficient and conveniently controlled and renders the control of the automobile simpler and smoother. Further advantages will be apparent to those skilled in the art as well as various changes and modifications which may be made to adopt the structure to different uses and control.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a transmission, in combination with driving and driven shafts, a sleeve slidably mounted on the driven shaft, a governor mounted on the driven shaft and adapted to reciprocate the said sleeve under control of the speed of rotation of the driven shaft, a countershaft driven by the driving shaft and adapted for movement toward and away from the sleeve, and cooperating gears of graduated sizes mounted on the sleeve and countershaft and adapted for selective engagement at various positions of the sleeve to connect the driving and driven shafts at various speed ratios.

2. In a transmission, in combination with driving and driven shafts, a sleeve slidably mounted on the driven shaft, a governor mounted on the driven shaft and adapted to reciprocate the said sleeve under control of the speed of rotation of the driven shaft, a countershaft driven by the driving shaft and adapted for movement toward and away from the sleeve, and cooperating gears of graduated sizes mounted on the sleeve and countershaft and adapted for selective engagement at various positions of the sleeve to connect the driving and driven shafts at various speed ratios, and a reverse gear assembly adapted to connect the gears on the sleeve and countershaft to reverse the direction of rotation of the driven shaft.

3. In a transmission, in combination with independently rotatable driving and driven shafts, a sliding sleeve mounted on the driven shaft to rotate therewith and spring set to normally move in one direction thereon, a governor driven by the driven shaft and adapted to pull the said sleeve along the shaft in the opposite direction, a countershaft adapted for movement toward and away from the said sleeve, drive gears connecting the drive shaft and countershaft, and low, intermediate and high speed gears on the said sleeve and countershaft adapted for selective engagement at various positions of the said sleeve when the countershaft is moved toward the sleeve.

4. In a transmission, in combination with independently rotatable driving and driven shafts, a sliding sleeve mounted on the driven shaft to rotate therewith and spring set to normally move in one direction thereon, a governor driven by the driven shaft and adapted to pull the said sleeve along the shaft in the opposite direction, a countershaft adapted for movement toward and away from the said sleeve, driven gears connecting the drive shaft and countershaft, and low, intermediate and high speed gears on the said sleeve and countershaft adapted for selective engagement at various positions of the said sleeve when the countershaft is moved toward the sleeve, and a reverse gear assembly comprising a pair of meshed pinions adapted to connect the drive gears on the driving shaft and countershaft when said countershaft is moved away from the sleeve, and an idler pinion adapted to simultaneously connect the low speed gears on the countershaft and sleeve.

5. In a transmission, in combination with rotary driving and driven shafts, a slidable sleeve mounted on the driven shaft, a governor driven by the driven shaft and connected to the sleeve, transmission gears on the sleeve, a countershaft, gears on the countershaft driven by the driving shaft and adapted for movement toward the sleeve for engagement with the transmission gears thereon.

6. In a transmission in combination with rotary driving and driven shafts, transmission gears slidably mounted on the driven shaft to rotate therewith, a governor driven by the driven shaft and connected to the said transmission gears, a countershaft driven by the driving shaft and adapted for movement toward and away from the driven shaft in parallelism thereto, and gears on the countershaft for engagement with the transmission gears.

7. In a transmission, in combination with rotary driving and driven shafts, transmission gears slidably connected to the driven shaft to rotate therewith, a governor driven by the driven shaft and connected to the transmission gears, a countershaft arranged in parallelism with the driving and driven shafts and adapted for movement toward and away therefrom mating gears on the driving shaft and countershaft and transmission gears on the countershaft for engagement with the transmission gears on the driven shaft.

8. In a transmission, in combination with rotary driving and driven shafts, transmission gears slidably arranged on the driven shaft to rotate therewith, a governor driven by the driven shaft and connected to the transmission gears for adjustment thereof longitudinally on the driven shaft, a gear on the drive shaft, a countershaft adapted for adjustment toward and away from the driving and driven shafts, and gears on the countershaft adapted to mesh with the gears on the driving and driven shaft for connecting the shafts at varying speed ratios.

9. In a transmission, in combination with rotary driving and driven shafts, transmission gears slidably arranged on the driven shaft to rotate therewith, means for moving the transmission gears to various positions on the driven shaft, a countershaft driving gear on the driving shaft, a countershaft adapted for movement toward and away from the driving and driven shafts, gears on the countershaft for engagement with the gears on the driving and driven shaft, a reverse shaft also adapted for movement toward and away from the driving and driven shafts, a pair of intermeshing pinions mounted on the reverse shaft and adapted to mesh with and connect the countershaft driving gear and one gear on the countershaft, and an idler pinion mounted on the reverse shaft for engagement with gears on the countershaft and driven shaft.

10. In a transmission, in combination with rotary driving and driven shafts, transmission gears longitudinally adjustable on the driven shaft, a countershaft adapted for movement toward and away from the driving and driven shafts, countershaft driving gears on the countershaft and driving shafts forward speed changing gears on the countershaft, a reverse shaft also adapted for movement toward and away from the driving and driven shafts, a pair of intermeshing reverse driving pinions on the reverse shaft and adapted to connect the countershaft gears, and an idler pinion on the reverse shaft and adapted to connect one of the forward speed changing and transmission gears.

11. In a transmission, in combination with rotary driving and driven shafts, transmission gears mounted on the driven shaft and longitudinally adjustable thereon, a countershaft adapted for movement toward and away from the driving and driven shafts, countershaft driving gears on the driving shaft and countershaft, transmission gears on the countershaft adapted for selective engagement with the transmission gears on the driven shaft, a pair of intermeshed reverse driving pinions adapted for engagement between the countershaft driving gears, an idler pinion adapted for engagement between an aligned pair of transmission gears on the countershaft and driven shaft, and a reverse shaft supporting the reverse driving pinions and idler pinion and also adjustable toward and away from the driving and driven shafts.

12. In a transmission, in combination with rotary driving and driven shafts, transmission gears mounted on the driven shafts, and longitudinally adjustable thereon, a countershaft adapted for movement toward and away from the driving and driven shafts, countershaft driving gears on the driving shaft and countershaft, transmission gears on the countershaft adapted for selective engagement with the transmission gears on the driven shaft, a pair of intermeshed reverse driving pinions adapted for engagement between the countershaft driving gears, an idler pinion adapted for engagement between an aligned pair of transmission gears on the countershaft and driven shaft, and a reverse shaft supporting the reverse driving pinions and idler pinion and movable toward and away from the gears on the countershaft and driving and driven shafts in a plane in line with the meeting point between the countershaft driving gears.

13. In a transmission, in combination with rotary driving and driven shafts, a sleeve slidably mounted on the driven shaft to rotate therewith a governor driven by the driven shaft and adapted to draw the sleeve inward on the shaft, a permanent stop pin in the driven shaft to limit the inward movement of the sleeve, the said driven shaft having a diametrically extended passage, a temporary stop ball mounted in the passage, a spring mounted in the passage and urging the said ball out against the sleeve, the said sleeve having a shallow recess adapted to receive the said ball at an intermediate position of the sleeve, and cooperating means for connecting the said driving shaft and sleeve at increasing speed ratios in the normal, intermediate and extreme positions of the sleeve.

In testimony whereof I affix my signature.

ERNEST A. WARD.